(12) United States Patent
Segaran

(10) Patent No.: US 9,342,622 B2
(45) Date of Patent: May 17, 2016

(54) TWO-PHASE CONSTRUCTION OF DATA GRAPHS FROM DISPARATE INPUTS

(71) Applicant: GOOGLE INC., Mountain View, CA (US)

(72) Inventor: Suresh Toby Segaran, San Francisco, CA (US)

(73) Assignee: Google Inc., Mountain View, CA (US)

( * ) Notice: Subject to any disclaimer, the term of this patent is extended or adjusted under 35 U.S.C. 154(b) by 316 days.

(21) Appl. No.: 13/929,127

(22) Filed: Jun. 27, 2013

(65) Prior Publication Data

US 2015/0006587 A1 Jan. 1, 2015

(51) Int. Cl.
*G06F 17/30* (2006.01)

(52) U.S. Cl.
CPC .............................. *G06F 17/30958* (2013.01)

(58) Field of Classification Search
CPC ................. G06F 17/30076; G06F 17/30156; G06F 17/30179; G06F 17/30958
USPC ........................................................ 707/798
See application file for complete search history.

(56) References Cited

U.S. PATENT DOCUMENTS

| 7,502,770 | B2 | 3/2009 | Hillis et al. |
| 7,587,387 | B2 | 9/2009 | Hogue |
| 7,765,206 | B2 | 7/2010 | Hillis et al. |
| 7,769,579 | B2 | 8/2010 | Zhao et al. |
| 7,774,328 | B2 | 8/2010 | Hogue et al. |
| 7,792,837 | B1 | 9/2010 | Zhao |
| 7,917,552 | B2 | 3/2011 | Mills |
| 7,925,610 | B2 | 4/2011 | Elbaz et al. |
| 8,122,026 | B1 | 2/2012 | Laroco et al. |
| 8,204,856 | B2 | 6/2012 | Meyer et al. |
| 8,326,847 | B2 | 12/2012 | Balmin et al. |
| 2010/0121839 | A1 | 5/2010 | Meyer et al. |
| 2010/0232433 | A1* | 9/2010 | Morris ........................ 370/392 |
| 2014/0122422 | A1* | 5/2014 | Tzadikevitch et al. ....... 707/610 |

FOREIGN PATENT DOCUMENTS

WO 2010085523 A1 7/2010

OTHER PUBLICATIONS

"Knowledge Graph", From Wikipedia, the free encyclopedia, retrieved on Apr. 29, 2013, from en.wikipedia.org/wiki/Knowledge_graph, 2 pages.

"Semantic Web", From Wikipedia, the free encyclopedia, retrieved on Apr. 29, 2013, from en.wikipedia.org/wiki/Semantic_web, 13 pages.

* cited by examiner

*Primary Examiner* — Alexey Shmatov
(74) *Attorney, Agent, or Firm* — Brake Hughes Bellermann LLP

(57) ABSTRACT

Some implementations generate multiple views of a combined data graph from disparate data graph sources in two phases. A first phase may convert each source data graph into a reconciled data graph and a second phase may generate a combined data graph from the various reconciled data graphs. For example, a method may include generating a reconciled data graph for each of a plurality of source data graphs and determining selected sources identified by a graph view file. The selected sources may be a subset of the plurality of sources represented by the source data graphs. The method may also include generating a combined data graph using the reconciled data graphs that correspond with the selected sources, and generating search results using the combined data graph.

21 Claims, 8 Drawing Sheets

TWO-PHASE CONSTRUCTION OF DATA GRAPHS FROM DISPARATE INPUTS

BACKGROUND

Data is often stored in various tabular formats. Such data can relate to entities, such as people, places, things, concepts, etc., and the relationships between entities. For example, a music database may store data on artists and albums, including which artist released a particular album, and which label produced the album. One way to better understand the relationships between entities in the table is to store the data in graph format where entities are represented by nodes and relationships between entities are represented by edges between nodes. For example, the nodes Tom Cruise and Mission Impossible may be linked by the edges of acted in and/or stars in a data graph based on a tabular movie database. The basic unit of such a data graph can be a triple that includes two nodes, or entities, and an edge, or relationship. The triple is sometimes referred to a subject-predicate-object triple, with one node acting as the subject, the second node acting as the object, and the relationship acting as the predicate. Of course a triple may include additional information, such as metadata about the entities and/or the relationship, in addition to identifying the subject, predicate, and object.

Data in a database or other data store may be used to generate a data graph. The data graph may assign the entities in the data graph a particular identifier, unique to the data set. Many such datasets may exist from different sources. But while the data graphs from disparate sources may each include some of the same entities, the source graphs cannot be searched together because they are each in their own identifier space. In other words, the Tom Cruise entity in one data graph has a different identifier than the Tom Cruise entity in another data graph. Furthermore each source dataset may be associated with restrictions on use, such as license terms or confidentiality restrictions, which may complicate the creation of a combined graph when the combined graph is available for public use. Furthermore some source data graphs may be from untrusted or untested sources, which can potentially corrupt a combined graph.

SUMMARY

Some implementations generate multiple views of a combined data graph from disparate data graph sources. Each source, such as Freebase, TV listings data, a music metadata source, etc., may generate a source data graph from the information in the respective source datasets. Each source may provide a source data graph and, optionally, a source evidence file that maps source identifiers in a source identifier space to a global identifier space or some other identifier space. The global identifier may represent a unique identifier for an entity across all sources. The system may generate a combined data graph from two or more source data graphs in two phases. A first phase may convert each source data graph into a reconciled data graph, which is a source data graph that has been converted from a source-specific identifier space into a global identifier space. The system may only generate a new reconciled data graph for a particular source when the source data graph changes, thus avoiding unnecessary processing. In some implementations, the system may store each version of the reconciled data graphs, so that an older version of a reconciled data graph can be used to roll back adverse changes.

The second phase for generating a combined data graph may include combining the various reconciled data graphs by joining the graphs at common nodes. The system can identify and eliminate duplicates. In some implementations, the sources of a particular entity may be retained as part of eliminating duplicates. The build phase may build different views of the combined data graph. For example, one view may include only reconciliation graphs from sources that contain publishable data. Another view may include only sources related to music, etc. The system may restrict access to the various views, so that access to a particular view complies with restrictions that apply to the sources included in the view.

One aspect of the disclosure can be embodied in a system that includes memory storing a first source data graph in a first identifier space and memory storing a reconciled version of a second source data graph. The second source data graph may be in a second identifier space and the reconciled version of the second source data graph may be in a third identifier space. The system may also include memory storing a master evidence file that maps the first identifier space to the third identifier space and the second identifier space to the third identifier space. The system may also include at least one processor and memory storing instructions that, when executed by the at least one processor, cause the system to perform operations. The operations may include generating a reconciled version of the first source data graph by substituting identifiers in the first source data graph with identifiers in the third identifier space using the master evidence file, and storing the reconciled version of the first source data graph. The operations may also include generating a combined data graph from the reconciled version of the first source data graph and the reconciled version of the second source data graph, the combined data graph being available for querying.

The system can include one or more of the following features. For example, generating the combined data graph can include determining that a first triple in the combined data graph is a duplicate of a second triple, moving metadata about the first triple to the second triple, and deleting the first triple from the combined data graph. In such implementations the metadata can include a source of the first triple, so that after moving the metadata, the second triple is associated with the source of the first triple. As another example, the operations may also include determining whether the first source data graph has changed and performing the generating when it is determined that the first source data graph has changed.

In some implementations, the system may also include a source evidence file that maps the first identifier space to the third identifier space, with the source evidence file mapping a particular entity in the first identifier space to a first global identifier in the third identifier space. The master evidence file may also map the particular entity to a second global identifier in the third identifier space. In such a system, the operations may also include determining that the master evidence file does not map the particular entity to the first global identifier and, responsive to the determining, updating the master evidence file so that it maps the particular entity to the first global identifier. The result may be that the particular entity maps to both the first global identifier and the second global identifier in the master evidence file.

As another example, the system may include a first source evidence file and a second source evidence file. The first source evidence file may map the first identifier space to a fourth identifier space, mapping a first source identifier for a particular entity to a second source identifier in the fourth identifier space. The second source evidence file maps the fourth identifier space to the third identifier space, mapping the second source identifier to a global identifier in the third identifier space. In such an implementation the substituting can include determining that the first source evidence file fails to map to the third identifier space, determining that the second source evidence file maps from the fourth identifier space to the third identifier space, and replacing, using the first source evidence file and the second source evidence file, the first source identifier with the global identifier in the reconciled version of the first source data graph. In some such implementations, the substituting can further include determining that the master evidence file fails to map the first source identifier to the global identifier and responsive to the determining, updating the master evidence file to map the first source identifier to the global identifier.

As another example, the system may also include memory storing a plurality of reconciled source data graphs in the third identifier space, with each reconciled source data graph being associated with a different source. The reconciled version of the first source data graph and the reconciled version of the second source data graph are included in the plurality of reconciled source data graphs. In such a system, the operations can also include determining a set of reconciled source data graphs identified by a graph view definition of a plurality of graph view definitions. The graph view definition identifies a set of the reconciled source data graphs, the set including the first source data graph and the reconciled version of the second source data graph. The operations in such an implementation may also include generating the combined data graph using the set of reconciled source data graphs. In such an implementation, a new reconciled source data graph for a new source may be added to the combined data graph by updating the graph view definition to include the new reconciled source data graph. Also in such an implementation the operations may include restricting access to the combined data graph in accordance with a restriction associated with the first source.

In another aspect, a computer-implemented method includes generating, by at least one processor, a reconciled data graph for each of a plurality of source data graphs, the reconciled data graphs being generated responsive to at least one update to the respective source data graphs. The method may also include determining, by the at least one processor, selected sources identified by a graph view file, the selected sources being a subset of the plurality of sources represented by the source data graphs, generating, by the at least one processor, a combined data graph using the reconciled data graphs that correspond with the selected sources, and generating search results using the combined data graph.

The system can include one or more of the following features. For example, the method may also include generating an entity provenance graph prior to generating the combined data graph and including the entity provenance graph in the combined data graph. As another example, the selected sources may be first selected sources and the combined data graph may be a first combined data graph and the method may include determining second selected sources identified by a second graph data view file. The second selected sources include at least one source that is not in the first selected sources. The method may also include generating a second combined data graph using the reconciled data graphs that correspond with the second selected sources. In some such implementations the method can include storing the first combined data graph in a first location and storing the second combined data graph in a second location. The first location may differ from the second location and access to the second location may be more restrictive than access to the first location.

As another example, the reconciled data graphs can comprise triples and generating the combined data graph can include appending the triples of the reconciled data graphs that correspond with the selected sources to generate the combined data graph, removing duplicate triples from the combined data graph, and removing conflicting triples from the combined data graph. In some implementations, removing duplicate triples includes determining that a first triple and a second triple match, updating a source attribute for the second triple to include the source of the first triple, and deleting the first triple from the combined data graph. In some implementations, removing conflicting triples includes determining that a third triple conflicts with the second triple, determining that the second triple exists in more sources than the third triple, and deleting the third triple.

In another aspect of the disclosure, a method may include generating, using at least one processor, a first reconciled data graph from a first source data graph using a master evidence file, the first reconciled data graph including a first set of triples. The method can also include generating, using the at least one processor, a second reconciled data graph from a second source data graph using the master evidence file, the second reconciled data graph including a second set of triples and the first source data graph differing from the second source data graph. The method may also include generating a combined data graph from the first reconciled data graph and the second reconciled data graph on a periodic basis. Generating the combined data graph may include appending the second set of triples to the first set of triples, identifying a first triple in the first set that matches a second triple in the second set, updating a source attribute for the second triple to reflect a value for the first source, and deleting the first triple.

The system can include one or more of the following features. For example, generating the first reconciled data graph may occur in response to at least one update to the first source data graph and generating the first reconciled data graph may result in a new version of the reconciled data graph. A prior version of the first reconciled data graph may be retained. In some such implementations, the method may include determining that the combined data graph is unstable and generating a new combined data graph from the prior version of the first reconciled data graph and the second reconciled data graph.

Another aspect of the disclosure can be embodied on a computer-readable medium having recorded and embodied thereon instructions that, when executed by a processor of a computer system, cause the computer system to perform any of the methods disclosed herein.

One or more of the implementations of the subject matter described herein can be implemented so as to realize one or more of the following advantages. As one example, the system integrates data from various sources into a single data graph, providing a centralized authority to assign global identifiers to the entities in the various sources. The enables a synergy that comes from searching a combination of data sources, As another example, the system provides various views of a combinable data graph, each one tailored to a use case or compliance with applicable restrictions, thus harnessing the synergy while still abiding by restrictions applicable to the various sources and accommodating various uses. Furthermore, the views may be created with the freshest possible data without wasting machine resources because although the various input data may be updated on different schedules, the data graph views can be generated independently of the schedules. The various views are also internally consistent because they contain no conflicts or duplicates, and externally consistent because they include matching identifiers for the same entities. The unified view of the disparate sources may provide a more complete and more useful user experience for applications that use the data.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
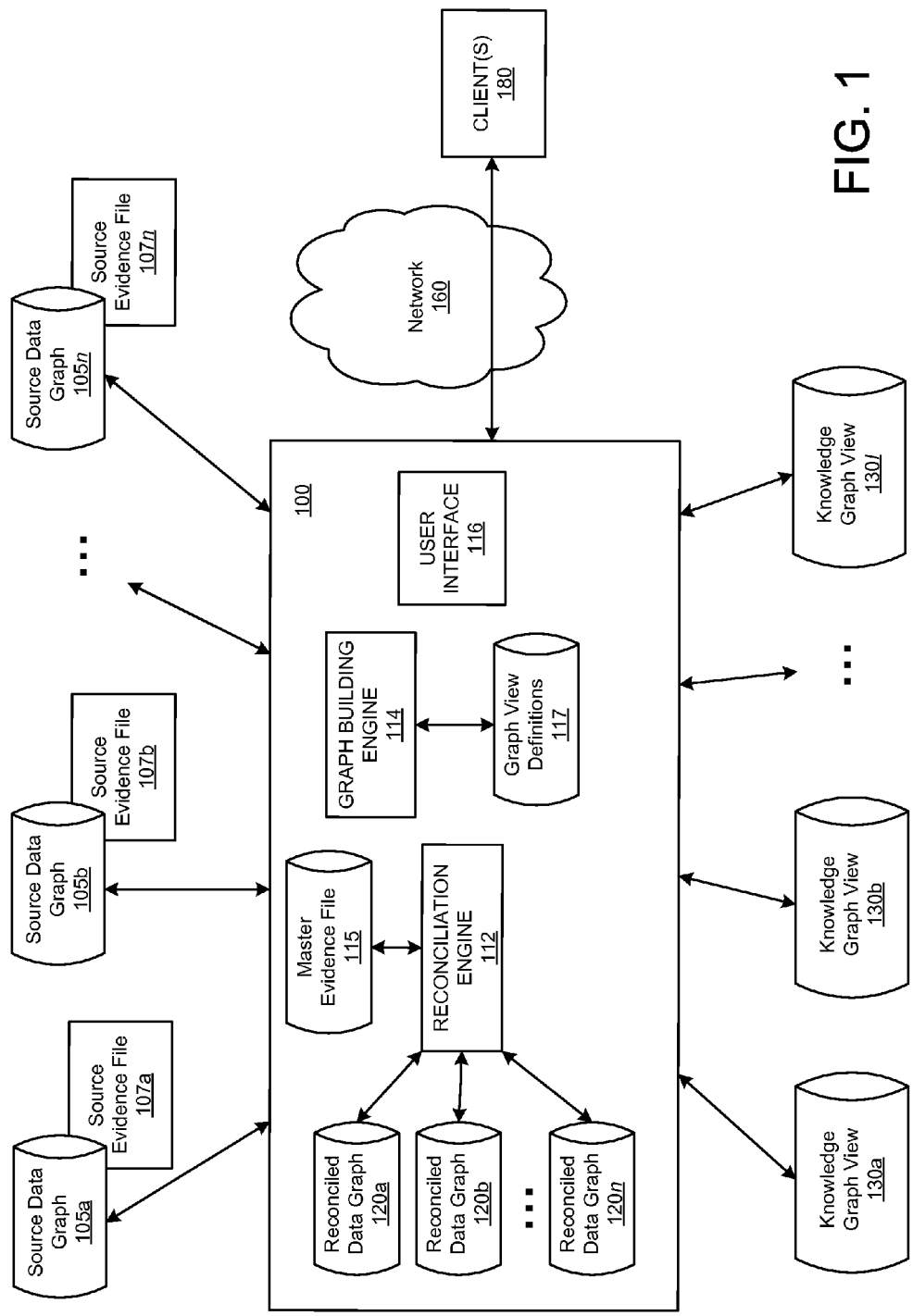
FIG. 1 illustrates an example system in accordance with some implementations.

FIG. 1 is a block diagram of a system 100 in accordance with an example implementation. The system 100 may be used to implement a graph-based data repository that combines information from disparate sources. The system may take the input from the disparate sources, convert the information into a single identifier space, and combine the disparate inputs in various ways to generate different views of the combined data graph in the graph-based data repository. One use of such a repository may be to provide or to enhance search results as part of a search engine. Of course implementations are not limited to such use of the data repository and other configurations and applications of the described technology may be used. For example, views may be used to supply data or search results to various applications, to produce reports, etc.

Figure 8:
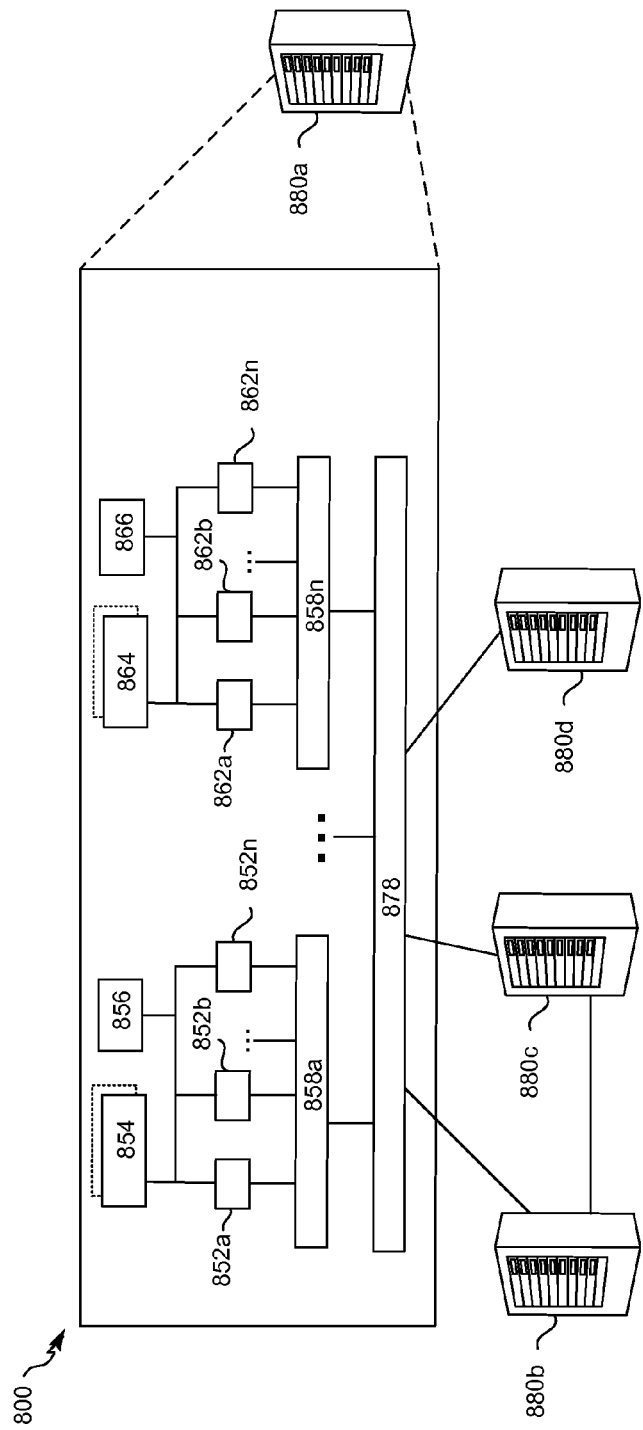
FIG. 8 shows an example of a distributed computer device that can be used to implement the described techniques.

The system 100 may include reconciliation engine 112, graph building engine 114, and user interface 116. System 100 may be a computing device that takes the form of a number of different devices, for example a standard server, a group of such servers, or a rack server system. In some implementations, reconciliation engine 112, graph building engine 114, and user interface 116 may each be a separate computing device, or they may share components such as processors and memories. For example, the reconciliation engine 112, the graph building engine 114, and the user interface 116 may be implemented in a personal computer, for example a laptop computer. In some implementations, the reconciliation engine 112, the graph building engine 114, and the user interface 116 may be distributed systems implemented in a series of computing devices, such as a group of servers. The system 100 may be an example of computer device 800, as depicted in FIG. 8.

The system 100 may receive source data graphs 105, for example 105a, 105b, and 105n where n is any positive integer, from various sources. In some implementations, the source data graphs 105a, 105b, and 105n may be stored in a designated directory, which may be accessible to system 100 or included in system 100. A data graph stores information in the form of nodes and edges, with nodes being connected by edges. A node in a data graph may represent an entity, such as a person, place, item, idea, topic, abstract concept, concrete element, other suitable thing, or any combination of these. Entities in the graph may be related to each other by edges, which may represent relationships between entities. For example, the data graph may have an entity that corresponds to George Washington and the data graph may have a has profession relationship between the George Washington entity and a U.S. President entity and a Military General entity. In some implementations, the data graph is stored using triples. A triple may represent two entities and a relationship that links the entities. The first entity may be a subject entity, the second entity may be an object entity, and the relationship may be a predicate. The entities and relationships may be represented by identifiers. While described as identifying two entities and a relationship, a triple can include additional information and is not limited to these three elements. For example, a triple may have a source attribute, the source attribute identifying the source of the triple.

The sources that supply source data graphs 105 may be varied. For example, source data graph 105a may include data from Freebase (www.freebase.com), a public, collaborative knowledge base. Source data graph 105b may include data from MediaNet™ (www.mndigital.com/catalog/music.html), a database of music information, and source data graph 105n may include data from a television listing service. Of course sources are not limited to those listed but can be any source of data. Some of the sources may be graph-based data stores, such as Freebase. Sources that are not natively graph-based may be converted to a graph-based format, as is known. Each source data graph may uniquely identify entities using an identifier space. An identifier space is a scheme or system of uniquely identifying an item within a particular set of data. For example, customer numbers are one identifier space as are employee numbers within a corporation.

Each of the source data graphs 105 may have a corresponding source evidence file 107. Thus, as illustrated in FIG. 1, source data graph 105a has a corresponding source evidence file 107a, source data graph 105b has a corresponding source evidence file 107b, and source data graph 105n has a corresponding source evidence file 107n. The source evidence file 107 may map a source identifier space to another identifier space, e.g. mapping a customer number to an employee number. In the source evidence files, source evidence file 107a may map an identifier for source a to a global identifier space, source evidence file 107b may map an identifier for source b to the identifier space for source a, and source evidence file 107n may map an identifier for source n to the global identifier space. The source evidence file 107 may be a product of some previous reconciliation between sources or with the global identifier space. While a majority of entities will likely have an entry in the source evidence file 107, the source evidence file 107 is not likely to have an entry for every entity in the corresponding source data graph 105.

Figure 2:
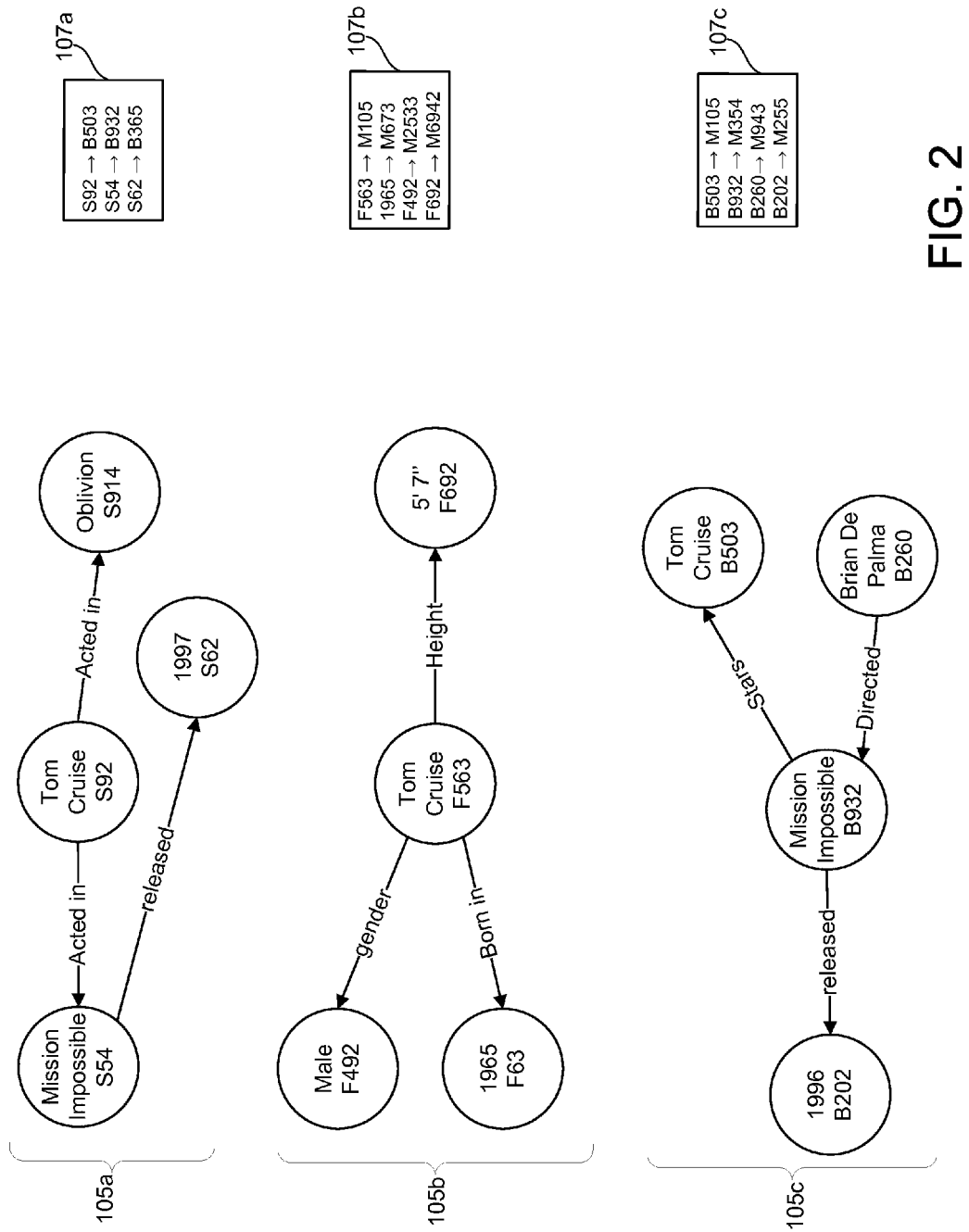
FIG. 2 illustrates an example representation of three source data graphs with entities as nodes and relationships as edges between nodes and illustrates source evidence files associated with each of the three source data graphs.

The source data graphs 105 may include information from which a graph, such as the graphs 105a, 105b, and 105c, illustrated in FIG. 2, can be created. The nodes of the data graph may be referred to as entities and the edges may be referred to as relationships between two entities. As used herein, entity may refer to a physical embodiment of a person, place, or thing or a representation of the physical entity, e.g., text, or other information that refers to an entity. For example, an entity may be the person Tom Cruise or an abstract concept that refers to Tom Cruise. FIG. 2 also illustrates source evidence files 107a, 107b, 107c, which correspond to source data graphs 105a, 105b, and 105c, respectively. As illustrated, the source evidence files 107 may include an identifier in a first address space, for example S92 of source evidence file 107a, to another address space, for example B503 of source evidence file 107a. As illustrated in FIG. 2, the source evidence file 107a maps identifiers to the address space used by source data graph 105c, and source evidence files 107b and 107c map to a global address space. Also illustrated in FIG. 2, each entity in the source data graph 105 need not have a corresponding entry in the source evidence file 107. For example, entity 5914 (Oblivion) of source data graph 105a does not have a corresponding entry in the source evidence file 107a. This may be an indication that the entity is newly added to the source data graph 105a.

The source data graphs 105 and the corresponding source evidence files 107 are stored on tangible computer-readable storage devices, for instance disk, flash, cache memory, or a combination of these, configured to store data in a semi-permanent or non-transient form. In some implementations the various source data graphs 105 and/or the source evidence files 107 may be stored in a combination of various memories.

The system 100 may also include a reconciliation engine 112. The reconciliation engine 112 may include one or more computing devices that include one or more processors configured to execute machine executable instructions or pieces of software, firmware, or a combination thereof. The reconciliation engine 112 may share a computing device or devices with the graph building engine 114, or may operate using one or more separate computing devices. The reconciliation engine 112 may convert the source data graphs 105 into reconciled data graphs 120. In some implementations, the reconciliation engine 112 may run periodically, for example daily, and check the source directories to determine if the source data graph 105 has changed. If a source data graph 105n has not changed, the reconciliation engine 112 may look for another source data graph 105. If the source data graph has changed, the reconciliation engine 112 may generate a reconciled data graph 120. Each source data graph 105a, 105b, and 105n may have a respective reconciled data graph 120a, 120b, and 120n.

The reconciliation engine 112 may use a master evidence file 115 and the source evidence file 107n that corresponds with a source data graph 105n to generate a reconciled data graph 120n, as will be explained in more detail below with regard to FIG. 4. The master evidence file 115 may map a source identifier to at least one global identifier. When the reconciliation engine 112 generates new global identifiers, the reconciliation engine 112 may add the new identifiers to the master evidence file 115. The master evidence file 115 may track accumulated reconciliation evidence over time, so the master evidence file 115 may include every global identifier ever assigned to a particular entity at any point in time. Thus, if entity A and entity B are each assigned a global identifier, but are later determined to be the same entity and merged into entity A, the master evidence file 115 may include a mapping of both global identifiers to entity A. This facilitates backward compatibility for data sources or queries that have not been updated. In some implementations, the reconciliation engine 112 may generate a triple or other entry in the reconciled data graph 120n that links entity A with the old global identifier (for entity B) with a replaced by relationship. The replaced by relationship may guarantee that any generated global identifier will point to the correct entity.

The system 100 may also include a graph building engine 114. The graph building engine 114 may generate a combined data graph, such as combined graph 130a, combined graph 130b, and combined graph 130i using two or more of the reconciled data graphs 120. Because each reconciled data graph 120 is in the global identifier space the reconciled data graphs can be combined to form a larger, more complete view of the data. Duplicate entries may be identified and eliminated. Conflicting data may also be identified and eliminated. In some implementations, the source of a triple may help determine which entry to keep when conflicting assertions are encountered. For example, one source may be more accurate or trustworthy that another source. Accordingly, the graph building engine 114 may keep facts from the trusted source that conflict with facts from a less trusted source.

In some implementations, the graph building engine may use graph view definitions 117 to build the various combined views 130. The graph view definitions 117 may indicate which reconciled data graphs 120 can be combined together. The graph view definitions 117 may also indicate what restrictions are placed on the resulting combined graph view 130. For example, some data sources may be considered public, without restrictions. One of the graph view definitions 117 may include each public source, resulting in combined graph view 130a, which can be provided to anyone. As another example, some data sources may be under license for certain uses or by certain groups of people. The graph building engine 114 may generate another combined graph view 130b that includes the licensed data source(s) and one or more publishable data sources. The resulting combined graph view 130b may be stored in a restricted location so that only authorized users or applications have access to the view 130b. A graph view definitions 117 can include definitions representing any combination of reconciled data graphs 120, because each reconciled data graph 120 is in the same identifier space, facilitating the merging of graphs at common nodes.

The system 100 may also include a user interface 116 that allows a user of, for example client 180, to set up and maintain graph view definitions 117, to update master evidence file 115, source evidence files 107b, etc. The system 110 may be in communication with the client(s) 180 over network 160. Network 160 may be for example, the Internet or the network 160 can be a wired or wireless local area network (LAN), wide area network (WAN), etc., implemented using, for example, gateway devices, bridges, switches, and/or so forth. Via the network 160, the system 100 may communicate with and transmit data to/from clients 180. For example, system 100 may receive and transmit data to one or more of clients 180.

Figure 3:
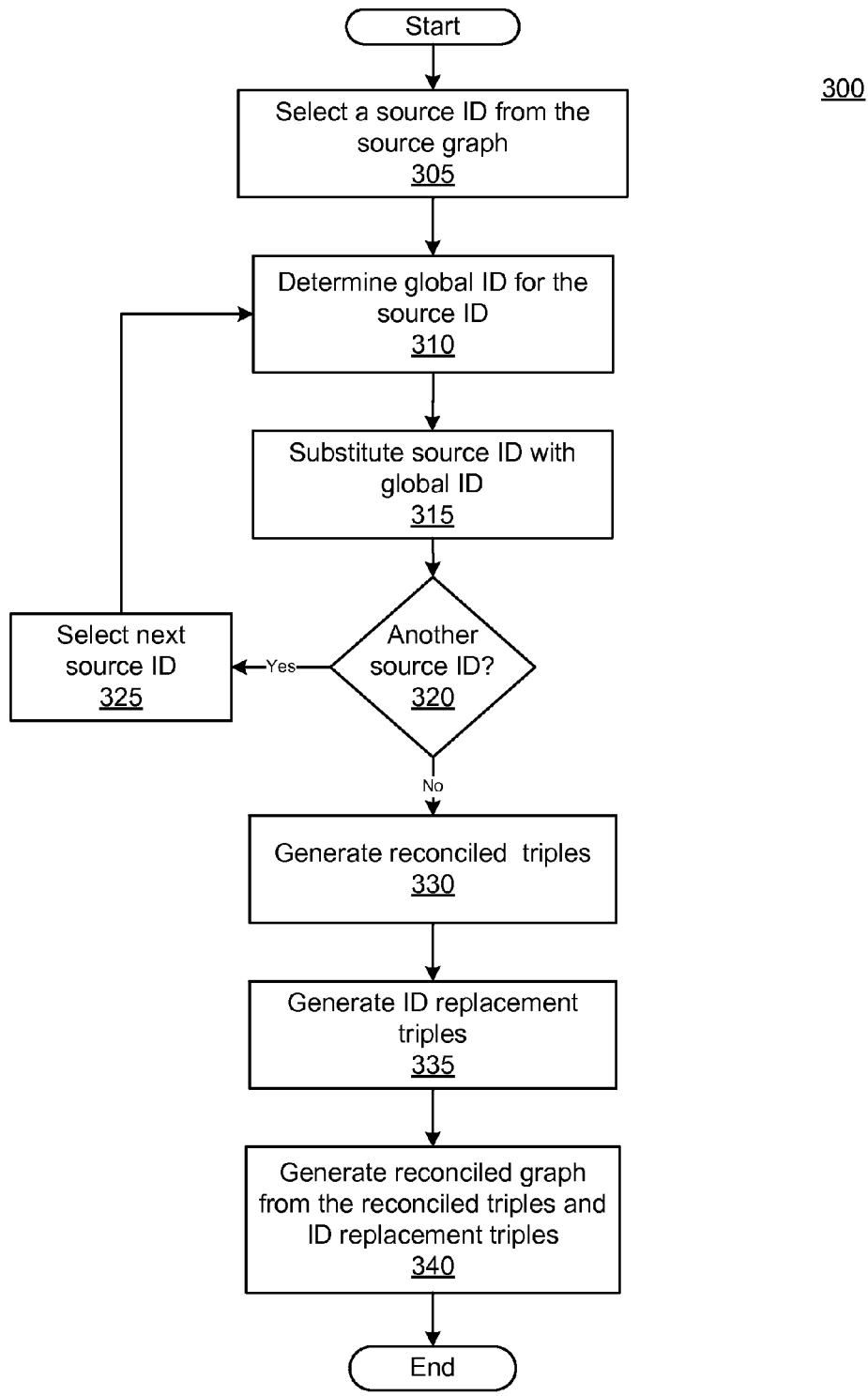
FIG. 3 illustrates a flow diagram of an example process for generating a reconciled source data graph, consistent with disclosed implementations.

FIG. 3 illustrates a flow diagram of an example process 300 for generating a reconciled source data graph, consistent with disclosed implementations. The process 300 may be performed by a reconciliation engine, such as the reconciliation engine 112 of FIG. 1. The reconciliation engine may execute process 300 periodically, checking a source directory or directories to determine whether to re-generate a reconciled data graph for the source. If the reconciliation engine determines that a source data graph or its source evidence file has changed, the reconciliation engine may proceed with process 300 for that source. In some implementations, the reconciliation engine may check a specific directory for source data graphs. Thus, to add an additional source for inclusion in one or more combined graph views, the new source data graph and the new source evidence file may simply be stored in the specific directory, or in a sub-directory of the specific directory. This illustrates one way the system is capable of scaling and adding any number of sources to a combined data graph with minimal effort.

Process 300 may begin when the reconciliation engine determines that a source data graph or a source evidence file has changed. Accordingly, the system avoids performing process 300 unnecessarily, for example performing process 300 on every source automatically or when one source has changed. When the reconciliation engine identifies a source with modifications since the last time a reconciliation graph was generated for the source, the reconciliation engine selects a source identifier for an entity or relationship in the source data graph (305). As discussed above, the identifiers for the source data graph are in a source identifier space, so that the identifiers are unique within the particular source, but not necessarily between the particular source and other sources. The reconciliation engine may then determine a global identifier for the source identifier selected (310). This process is explained in more detail below with regard to FIG. 4.

The reconciliation engine may substitute the source identifier for the entity or relationship with the global identifier throughout the data graph (315). Replacement may be performed in any variety of manners. For example, in some implementations the replacement engine may build a temporary map that maps the source identifier to its global identifier. As another example, when the data graph uses triples, the reconciliation engine may look at each triple and each time the source identifier is found the reconciliation engine may replace the source identifier with the global identifier. Of course other methods of substituting the source identifier with the global identifier may be used. If other source identifiers exist (320, Yes), the reconciliation engine may move to the next source identifier (325), and repeat steps 310 and 315 until all source identifiers have been substituted with a global identifier (320, No).

The reconciliation engine may generate the reconciled triples (330). This may be a separate step or part of step 315 depending on the method of substitution. For example, if the reconciliation engine generates a map, the reconciliation engine may use the map to generate reconciled triples for each triple in the source data graph. If the reconciliation engine performs the substitution on the triples as global identifiers are determined, the result of the substitution may be the reconciled triples. Generating the reconciled triples has the effect of generating the reconciled data graph.

The reconciliation engine may also generate identifier replacement triples (335) for the reconciled data graph. In some implementations, the master evidence file may include two or more global identifiers for one source identifier. As explained with regard to FIG. 4, one of the identifiers may be chosen for substitution. The global identifiers in the master evidence file not selected for substitution may be used to generate identification replacement triples. An identification triple may represent the global identifier selected for substitution as one entity connected to a global identifier not selected for substitution as another entity by a special relationship. The special relationship may be a relationship that indicates that global identifier not selected for substitution was replaced by the global identifier selected for substitution, for example a replaced by relationship. This special relationship provides a guarantee that any generated global identifier will point to the correct entity, ensuring that the combined graphs have backward-compatibility with queries or other processes that use a different global identifier than the one selected to replace the source identifier.

The reconciliation engine may then generate the reconciled data graph for the source using the reconciled triples and replacement triples (340). Again, this step may be performed as a separate step or may be the result of previous steps, such as various combinations of 315, 330, and 335. Once the reconciliation engine has generated the reconciled data graph, process 300 for this data source is complete. The reconciliation engine may continue inspecting sources and perform process 300, as needed, on other sources. In some implementations the reconciliation engine runs periodically, generating a replacement reconciliation data graph, if needed, once per hour, twice per day, etc.

In some implementations, the reconciliation engine may retain previously generated reconciled data graphs. Thus, the system may include various versions of a reconciled data graph for a particular source. The prior versions may be used to recover from a bad update that causes a combined view to become unstable or unusable.

Figure 4:
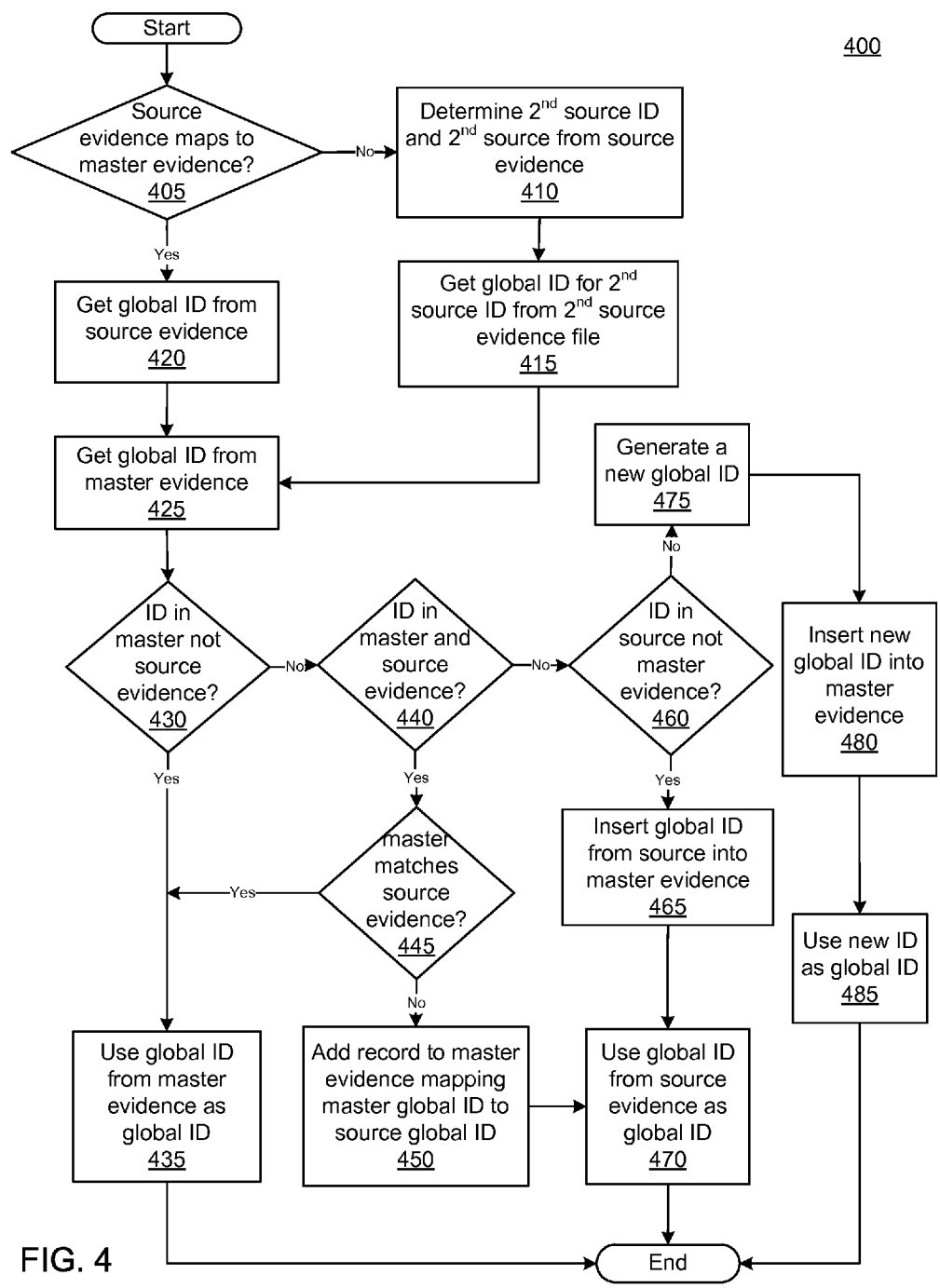
FIG. 4 illustrates a flow diagram of an example process for determining a global identifier for a source identifier, consistent with disclosed implementations.

FIG. 4 illustrates a flow diagram of an example process 400 for determining a global identifier for a given source identifier, consistent with disclosed implementations. Process 400 may be performed by a reconciliation engine as part of step 310 of FIG. 3, to determine which global identifier to use to identify a particular entity in the reconciled data graphs. At step 405, the reconciliation engine may determine whether the source evidence file for the source system maps from the source identifier space to the global identifier space. If the source evidence file does not map to the global identifier space (405, No), the reconciliation engine may look for a second source evidence file that the original source evidence file maps to (410) and use the global identifier from the second source evidence file (415). In other words, the reconciliation engine may use a chain of source evidence files to determine a global identifier for the source identifier. For example, as illustrated in FIG. 2, the source evidence file 107*a* maps the identifier space of data graph 105*a* to the identifier space for data graph 105*c*. Accordingly, the reconciliation engine may use the source evidence file 107*c* to determine the global identifier for source identifiers in the source evidence file 107*a*. For example, the reconciliation engine may determine that S92 maps to B503 in source evidence file 107*a*, and B503 maps to M105 in source evidence file 107*c*. Thus, the reconciliation engine may determine that M105 is a global identifier for S92 from the source evidence file.

If the source evidence file does map to the global identifier space (405, Yes), the reconciliation engine may use the global identifier identified in the source evidence file (420). For example, if the reconciliation engine is determining a global identifier for F492 of data graph 105*b*, the system may determine that M2533 is the global identifier using source evidence file 107*b*. It is possible that a global identifier does not exist in a source evidence file, so the reconciliation engine may skip step 420 or step 415. The reconciliation engine may also attempt to determine the global identifier for the source identifier from the master evidence file (step 425). The master evidence file may also not include an entry for a particular source identifier. This may occur when the entity represented by the source identifier is newly added to a source data graph. In such a situation the reconciliation engine may bypass step 425.

The reconciliation engine may then determine whether to use a global identifier from the source evidence file or the master evidence file in generating a reconciliation graph. The reconciliation engine may use the chosen global identifier in substituting the source identifier as part of step 315 of FIG. 3. If the reconciliation engine finds a global identifier in the master evidence file but not in the source evidence file (430, Yes), the reconciliation engine may use the global identifier from the master evidence file as the chosen global identifier (435). If the master evidence file includes more than one global identifier for the source identifier, the reconciliation engine may select one of the identifiers. In some implementations, the master evidence file may include an indication of trustworthiness or validity for a global identifier. For example, a global identifier may have an associated flag, property, attribute, or some other indication that the global identifier is a preferred identifier or is no longer a valid identifier.

If the reconciliation engine does find a global identifier in the source evidence file, or if the master evidence file lacks a global identifier (430, No), the reconciliation engine may determine whether a global identifier exists in the master and in the source evidence files (440). If so (440, Yes), the reconciliation engine may determine whether the two global identifiers match (445). If the global identifiers match (445, Yes), the global identifier is used as the chosen identifier (435). If they do not match (445, No), the reconciliation engine may add a record to the master evidence file (450). The newly added record may map the source identifier to the global identifier found in the source evidence file. One reason the source evidence file may have a different global identifier than the master evidence file is because the entity represented by the source identifier was previously assigned a global identifier but it has been determined that the entity matches an entity in another source data graph that maps to a different global identifier. The record is added to the master evidence file so that the master evidence file can properly assign the global identifier in the future. In some implementations, the global identifier that was in the master evidence file may receive an indication, such as a flag, mark, time-stamp, etc., that indicates that the identifier is a prior identifier so that it is not chosen over the newly added global identifier in the future. The reconciliation engine may the use the global identifier from the source evidence file as the chosen global identifier (470).

If the identifier was not in both the source and the master evidence files (440, No), the reconciliation engine may determine whether the global identifier was in the source evidence file and not the master evidence file (460). If it is (460, Yes), the reconciliation engine may insert a record into the master evidence file that maps the source identifier to the global identifier from the source evidence file (465). The reconciliation engine may then use the global identifier from the source evidence file as the chosen global identifier (470).

If neither the source evidence file nor the master evidence file includes a global identifier for the source identifier (460, No), the reconciliation engine may generate, or mint, a new global identifier (475). Because the reconciliation engine generates global identifiers for all sources, the newly minted number is unique across all sources. The reconciliation engine may insert a record into the master evidence file that maps the source identifier to the global identifier (480), so that the global identifier can be used the next time the reconciliation engine generates a reconciled data graph for this source. The reconciliation engine may then use the newly generated global identifier as the chosen identifier (485). Process 400 demonstrates how a global identifier may be chosen based on the source evidence file and the master evidence file.

Figure 5:
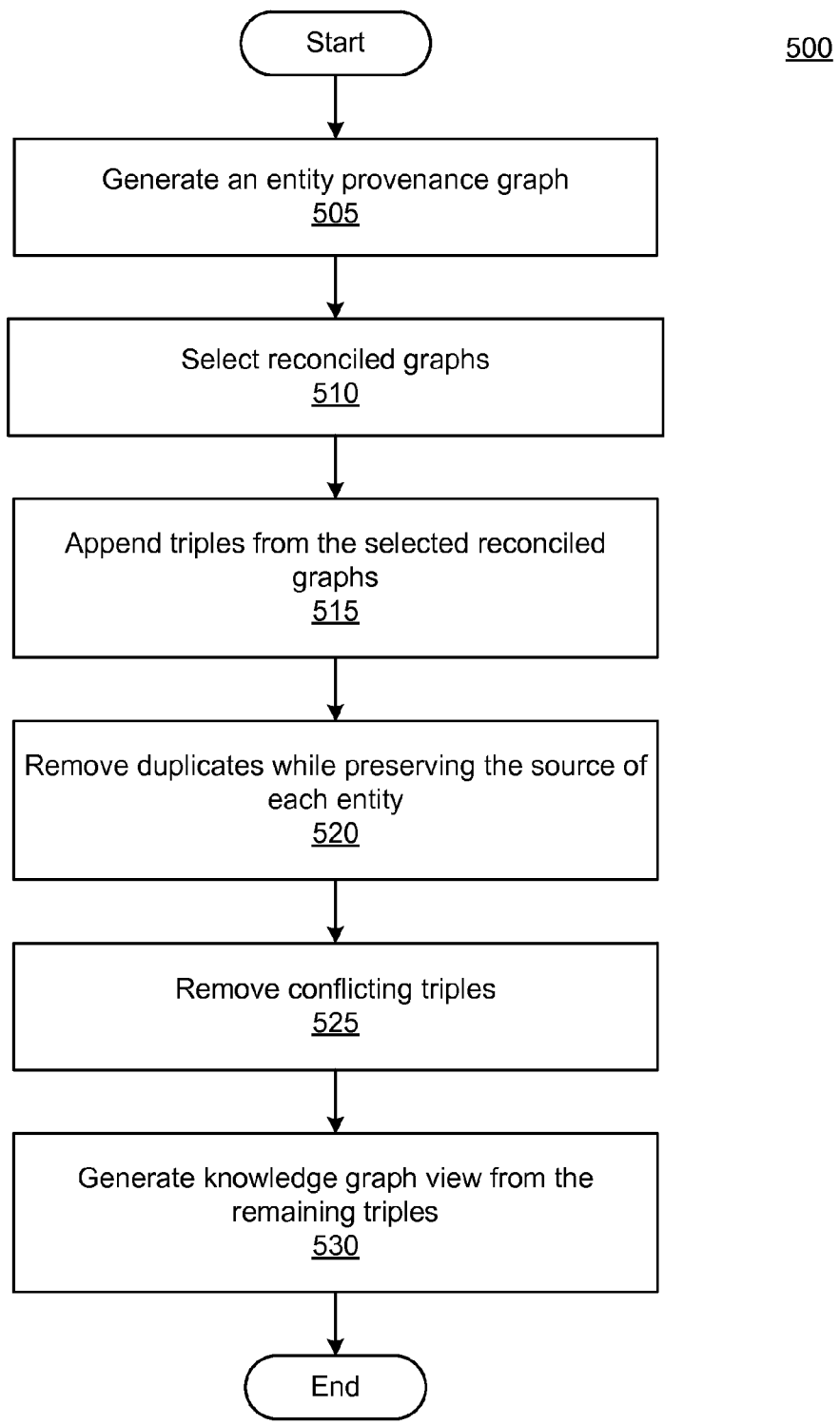
FIG. 5 illustrates a flow diagram of an example process for building a consolidated data graph view, consistent with disclosed implementations.

FIG. 5 illustrates a flow diagram of an example process 500 for building a consolidated data graph view, consistent with disclosed implementations. A graph building engine, such as graph building engine 114 of FIG. 1, may perform process 500 periodically or on-demand to generate a view of the reconciled data graph. The graph building engine 114 may repeat process 500 once for each definition in the graph view definitions. Process 500 may start with the graph building engine 114 generating an entity provenance graph (505). The entity provenance graph may include, for each entity in the master identifier file, triples specifying links to the original source data that describes the entity. The entity provenance graph does not include triples from the source graphs. An entity provenance graph thus may specify where entities came from and can be included in each combined graph view. Its inclusion enables a user to determine where the entity exists even if the source data is not included in the view.

The graph building engine 114 may select reconciled graphs to include in the view (510). For example, the graph building engine 114 may select graphs identified in one of the graph view definitions. As discussed above, various views may be generated to comply with data restrictions, use cases, or other reasons. In addition, the entity provenance graph may be selected as a reconciled graph for inclusion in the view, even if not in the view definition. The graph building engine 114 may append the triples from the selected reconciled graphs (515), including the entity provenance graph. Because the triples are in the global identifiers space, the combined data graph view may be the combination of triples from each reconciled graph. But appending the triples may generate duplicate entries and conflicting entries. Accordingly, the graph building engine 114 may look for and remove duplicates (520). For example, in some implementations, the graph building engine 114 may sort the appended triples, so that triples having the same subject entities and relationships (predicates) are grouped together. If duplicate triples are found, the graph building engine 114 may eliminate one of the triples. However, in order to preserve the source of each triple, the graph building engine 114 may update metadata for the preserved triple to indicate that the triple was found in two different sources. The metadata can be stored as an attribute of the triple.

The graph building engine may also look for and remove conflicting triples (525). Specifically, some relationships may have only one object entity for each subject entity. For example, a person may have only one height and one birthdate. The number of relationships allowed for a subject entity may be an attribute of the relationship or edge. The graph building engine 114 may identify relationships with such limits and look for triples that violate the limit. For example, if the entity Tom Cruise has two height relationships in the appended triples, the graph building engine 114 may eliminate one of the conflicting triples. In some implementations, the graph building engine 114 may eliminate the triple from the less-trusted source. In some implementations, the graph building engine 114 may eliminate the triple that is from fewer sources. For example, one of the triples may have been a duplicate, so now has an indication that the triple existed in two sources. The graph building engine 114 may select the triple from two sources over the triple from a single source.

The graph building engine 114 may store the remaining triples as a combined graph view (530). The view may be stored independently of other combined data graph views. In some implementations, the each view may have a set of associated restrictions, so that only certain applications or users may access the view.

Figure 6:
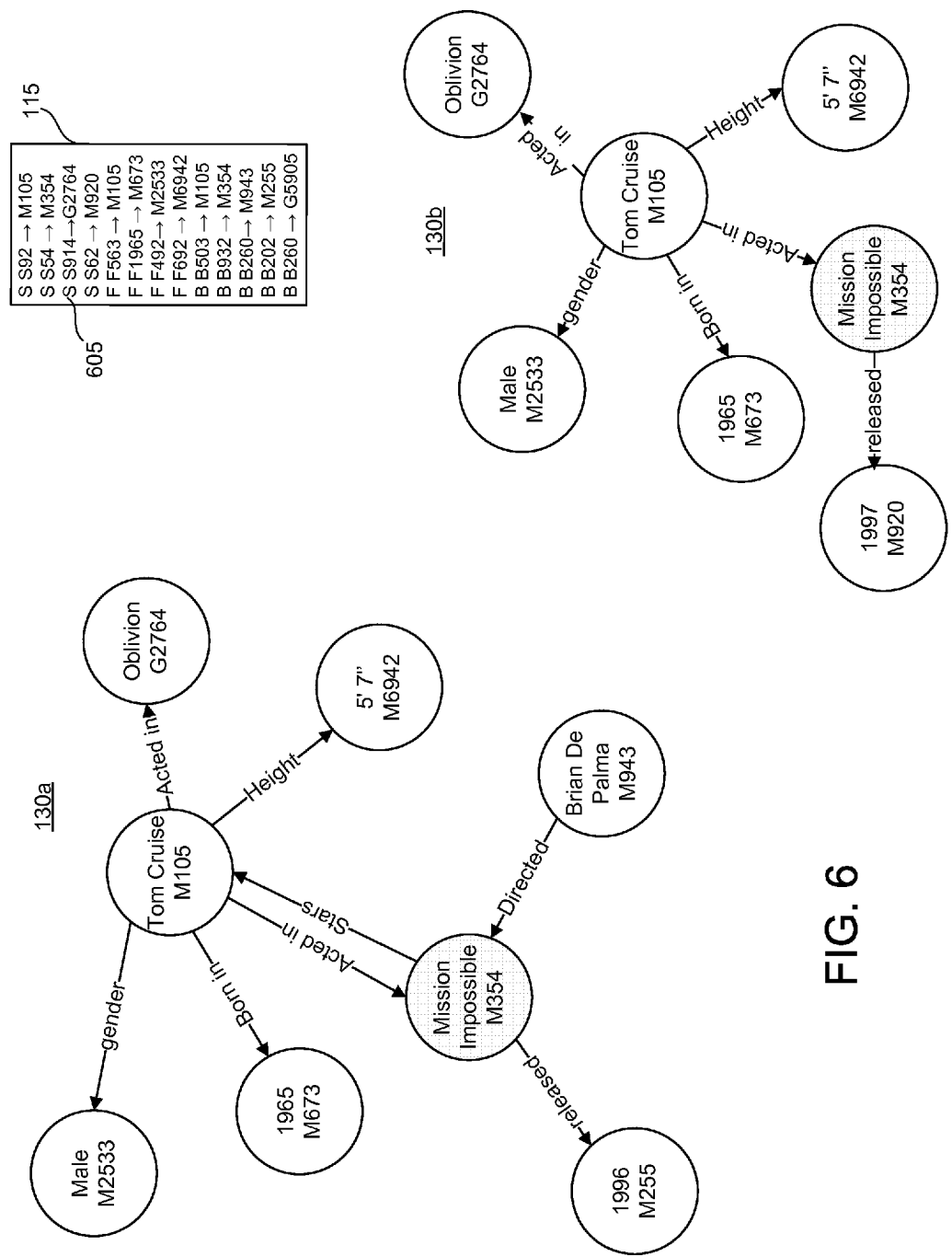
FIG. 6 illustrates an example representation of two combined data graph views generated using two or more of the source data graphs of FIG. 2 and a master evidence file.

FIG. 6 illustrates an example representation of two combined data graph views generated using two or more of the source data graphs of FIG. 2, and illustrates a master evidence file. In the example of FIG. 6 source graphs 105a, 105b, and 105c have been converted to respective reconciled graphs and combined to form view 130a. As illustrated, the graphs are combined at nodes common to two or more graphs, namely Tom Cruise and Mission Impossible. Thus, the combined view 130a may provide a more complete picture of the data from the various sources. Furthermore, FIG. 6 illustrates the minting of a new global identifier for the entity Oblivion. Specifically, the Oblivion entity did not have an identifier in the source evidence file 107a illustrated in FIG. 2. Through the reconciliation process, described with regard to FIGS. 3 and 4, the system has generated a global identifier for the entity Oblivion and inserted it into the master evidence file 115, labeled as item 605 in FIG. 6.

Also in the example of FIG. 6, source graphs 105a and 105b have been used to generate view 130b. View 130b may be generated because source data 105c has a restriction, so it may not be available to particular applications or users. Thus, the system can create a view of the combined sources that excludes the information from 105c. FIG. 6 also illustrates the elimination of conflicting facts. Source 105a of FIG. 2 indicates that Mission Impossible was released in 1997. Source 105c of FIG. 2 indicates that Mission Impossible was released in 1996. When the graph building engine combines the triples from each source, it may detect that the subject entity Mission Impossible has two different object entities for the released relationship. Thus, the graph building engine may eliminate one of the two triples from the combined data graph view. For example, the source for 105c may be of better quality or more trusted than the source for 105a. FIG. 6 also illustrates that the combined data graph view 130b does not include the conflicting triples, so the combined data graph view 130b includes the release date of 1997.

Figure 7:
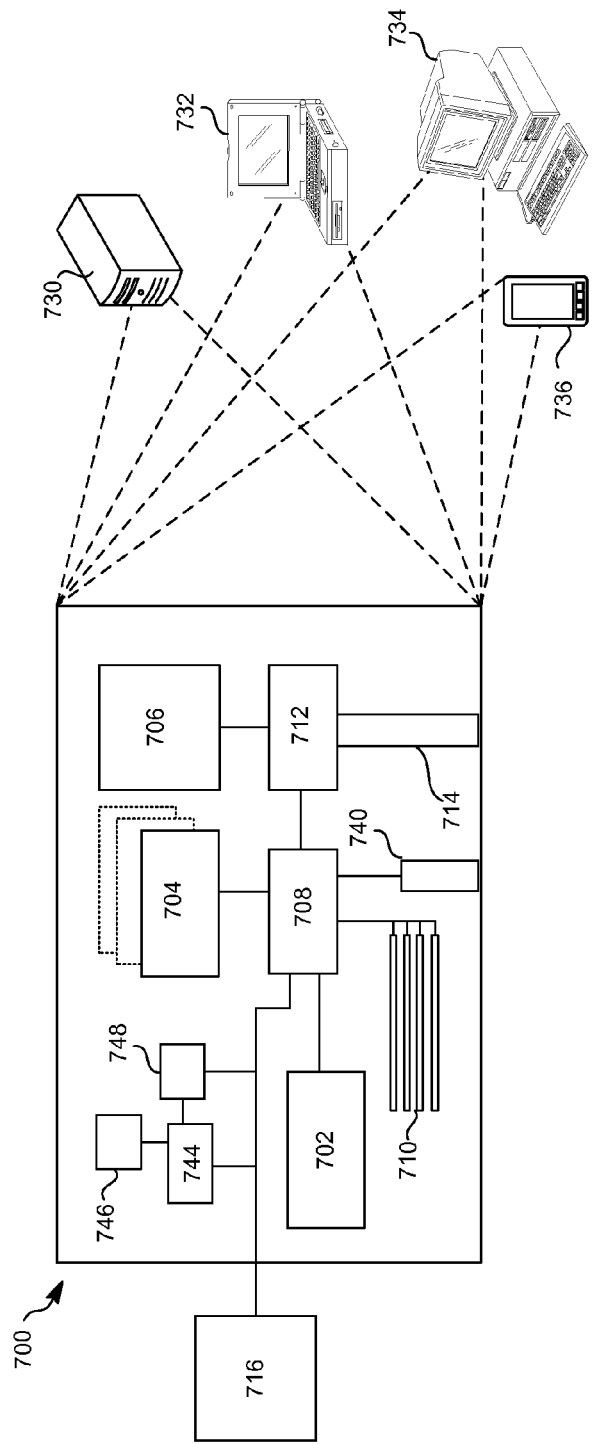
FIG. 7 shows an example of a computer device that can be used to implement the described techniques.

FIG. 7 shows an example of a generic computer device 700, which may be system 100, and/or client 180 of FIG. 1, which may be used with the techniques described here. Computing device 700 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 700 includes a processor 702, memory 704, a storage device 706, and expansion ports 710 connected via an interface 708. In some implementations, computing device 700 may include transceiver 746, communication interface 744, and a GPS (Global Positioning System) receiver module 748, among other components, connected via interface 708. Device 700 may communicate wirelessly through communication interface 744, which may include digital signal processing circuitry where necessary. Each of the components 702, 704, 706, 708, 710, 740, 744, 746, and 748 may be mounted on a common motherboard or in other manners as appropriate.

The processor 702 can process instructions for execution within the computing device 700, including instructions stored in the memory 704 or on the storage device 706 to display graphical information for a GUI on an external input/output device, such as display 716. Display 716 may be a monitor or a flat touchscreen display. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk. In some implementations, the memory 704 may include expansion memory provided through an expansion interface.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 704, the storage device 706, or memory on processor 702.

The interface 708 may be a high speed controller that manages bandwidth-intensive operations for the computing device 700 or a low speed controller that manages lower bandwidth-intensive operations, or a combination of such controllers. An external interface 740 may be provided so as to enable near area communication of device 700 with other devices. In some implementations, controller 708 may be coupled to storage device 706 and expansion port 714. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 730, or multiple times in a group of such servers. It may also be implemented as part of a rack server system. In addition, it may be implemented in a personal computer such as a laptop computer 722, or smart phone 736. An entire system may be made up of multiple computing devices 700 communicating with each other. Other configurations are possible.

FIG. 8 shows an example of a generic computer device 800, which may be system 100 of FIG. 1, which may be used with the techniques described here. Computing device 800 is intended to represent various example forms of large-scale data processing devices, such as servers, blade servers, datacenters, mainframes, and other large-scale computing devices. Computing device 800 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 800 may include any number of computing devices 880. Computing devices 880 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 880a includes multiple racks 858a-858n. Each rack may include one or more processors, such as processors 852a-852n and 862a-862n. The processors may include data processors, network attached storage devices, and other computer controlled devices. In some implementations, one processor may operate as a master processor and control the scheduling and data distribution tasks. Processors may be interconnected through one or more rack switches 858, and one or more racks may be connected through switch 878. Switch 878 may handle communications between multiple connected computing devices 800.

Each rack may include memory, such as memory 854 and memory 864, and storage, such as 856 and 866. Storage 856 and 866 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 856 or 866 may be shared between multiple processors, multiple racks, or multiple computing devices and may include a computer-readable medium storing instructions executable by one or more of the processors. Memory 854 and 864 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 854 may also be shared between processors 852a-852n. Data structures, such as an index, may be stored, for example, across storage 856 and memory 854. Computing device 800 may include other components not shown, such as controllers, buses, input/output devices, communications modules, etc.

An entire system, such as system 100, may be made up of multiple computing devices 800 communicating with each other. For example, device 880a may communicate with devices 880b, 880c, and 880d, and these may collectively be known as system 100. As another example, system 100 of FIG. 1 may include one or more computing devices 800 as search engine 116. Furthermore, some of the computing devices may be located geographically close to each other, and others may be located geographically distant. The layout of system 800 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer system comprising:
    memory storing a first source data graph in a first identifier space, the first identifier space uniquely identifying items in the first source;
    memory storing a reconciled version of a second source data graph, the second source data graph being in a second identifier space and the reconciled version of the second source data graph being in a third identifier space, the second identifier space uniquely identifying items in the second source and the third identifier space uniquely identifying items to the computer system, wherein the first identifier space, the second identifier space, and the third identifier space differ from each other;
    memory storing a master evidence file that maps the first identifier space to the third identifier space and the second identifier space to the third identifier space;
    at least one processor; and
    memory storing instructions that, when executed by the at least one processor cause the system to:
        generate a reconciled version of the first source data graph by substituting identifiers in the first source data graph with identifiers in the third identifier space using the master evidence file,
        store the reconciled version of the first source data graph, and
        generate a combined data graph from the reconciled version of the first source data graph and the reconciled version of the second source data graph, the combined data graph being available for querying.

2. The system of claim 1, wherein generating the combined data graph includes:
    determining that a first triple in the combined data graph is a duplicate of a second triple;
    moving metadata about the first triple to the second triple; and
    deleting the first triple from the combined data graph.

3. The system of claim 2, wherein the metadata includes a source of the first triple, so that after moving the metadata, the second triple is associated with the source of the first triple.

4. The system of claim 1, further comprising:
    memory storing a plurality of reconciled source data graphs, each reconciled source data graph being associated with a different source, wherein the plurality of reconciled source data graphs are in the third identifier space, and wherein the reconciled version of the first source data graph and the reconciled version of the second source data graph are included in the plurality, and wherein the memory further stores instructions that, when executed by the at least one processor, cause the computer system to:

determine a set of reconciled source data graphs identified by a graph view definition of a plurality of graph view definitions, the graph view definition identifying a set of the reconciled source data graphs, the set including the first source data graph and the reconciled version of the second source data graph, and generate the combined data graph using the set of reconciled source data graphs.

5. The system of claim 4, wherein a new reconciled source data graph for a new source is added to the combined data graph by updating the graph view definition to include the new reconciled source data graph.

6. The system of claim 4, wherein the memory further stores instructions that, when executed by the at least one processor, cause the computer system to restrict access to the combined data graph in accordance with a restriction associated with the first source.

7. The system of claim 1, further comprising:

a source evidence file that maps the first identifier space to the third identifier space, the source evidence file mapping a particular entity in the first identifier space to a first global identifier in the third identifier space, wherein the master evidence file maps the particular entity to a second global identifier in the third identifier space, and wherein the memory further stores instructions that, when executed by the at least one processor, cause the computer system to:

determine the master evidence file does not map the particular entity to the first global identifier, and responsive to the determining, updating the master evidence file to map the particular entity to the first global identifier, resulting in the particular entity mapping to both the first global identifier and the second global identifier in the master evidence file.

8. The system of claim 1, further comprising:

a first source evidence file that maps the first identifier space to a fourth identifier space, the first source evidence file mapping a first source identifier for a particular entity to a second source identifier in the fourth identifier space; and a second source evidence file that maps the fourth identifier space to the third identifier space, the second source evidence file mapping the second source identifier to a global identifier in the third identifier space, wherein the substituting includes:

determining that the first source evidence file fails to map to the third identifier space, determining that the second source evidence file maps from the fourth identifier space to the third identifier space, and replacing, using the first source evidence file and the second source evidence file, the first source identifier with the global identifier in the reconciled version of the first source data graph.

9. The system of claim 8, wherein the substituting further includes:

determining that the master evidence file fails to map the first source identifier to the global identifier; and responsive to the determining, updating the master evidence file to map the first source identifier to the global identifier.

10. The system of claim 1, wherein the memory further stores instructions that, when executed by the at least one processor, cause the computer system to:

determine whether the first source data graph has changed; and perform the generating when it is determined that the first source data graph has changed.

11. A computer-implemented method comprising:

generating, using at least one processor, a first reconciled data graph from a first source data graph using a master evidence file, the first reconciled data graph including a first set of triples, wherein the first reconciled data graph is in a global identifier space and the first source data graph is in a first local identifier space, the master evidence file mapping the first local identifier space to the global identifier space and a second local identifier space to the global identifier space;

generating, using the at least one processor, a second reconciled data graph from a second source data graph using the master evidence file, wherein the second reconciled data graph includes a second set of triples and the first source data graph differs from the second source data graph, wherein the second reconciled data graph is in the global identifier space and the second source data graph is in the second local identifier space, the first local identifier space differing from the second local identifier space;

generating a combined data graph from the first reconciled data graph and the second reconciled data graph on a periodic basis by:

appending the second set of triples to the first set of triples, identifying a first triple in the first set of triples that matches a second triple in the second set of triples, updating a source attribute for the second triple to reflect a value for the first source, and deleting the first triple; and making the combined data graph available for querying.

12. The method of claim 11, wherein generating the first reconciled data graph occurs in response to at least one update to the first source data graph.

13. The method of claim 12, wherein generating the first reconciled data graph results in a new version of the reconciled data graph and wherein a prior version of the first reconciled data graph is retained.

14. The method of claim 13, further comprising:

determining that the combined data graph is unstable; and generating a new combined data graph from the prior version of the first reconciled data graph and the second reconciled data graph.

15. A method comprising:

generating a reconciled version of a first source data graph in a first identifier space by substituting identifiers in the first source data graph with identifiers in a third identifier space using a master evidence file, the first identifier space uniquely identifying items in the first source, and the third identifier space uniquely identifying items to a computer system, and the master evidence file mapping the first identifier space to the third identifier space and a second identifier space to the third identifier space;

generating a reconciled version of a second source data graph, the second source data graph being in the second identifier space and the reconciled version of the second source data graph being in the third identifier space, the second identifier space uniquely identifying items in the second source, wherein the first identifier space, the second identifier space, and the third identifier space differ from each other;

generating a combined data graph from the reconciled version of the first source data graph and the reconciled version of the second source data graph; and making the combined data graph available for querying.

16. The method of claim 15, wherein generating the combined data graph includes:

determining that a first triple in the combined data graph is a duplicate of a second triple;

moving metadata about the first triple to the second triple; and deleting the first triple from the combined data graph.

17. The method of claim 16, wherein the metadata includes a source of the first triple, so that after moving the metadata, the second triple is associated with the source of the first triple.

18. The method of claim 15, wherein the reconciled version of the first source data graph and the reconciled version of the second source data graph are included in a plurality of reconciled source data graphs, each reconciled source data graph being associated with a different source, wherein the plurality of reconciled source data graphs are in the third identifier space, and the method further comprises:

determining a set of reconciled source data graphs identified by a graph view definition of a plurality of graph view definitions, the graph view definition identifying a set of the reconciled source data graphs, the set including the first source data graph and the reconciled version of the second source data graph; and generating the combined data graph using the set of reconciled source data graphs.

19. The method of claim 18, wherein a new reconciled source data graph for a new source is added to the combined data graph by updating the graph view definition to include the new reconciled source data graph.

20. The method of claim 18, further comprising restricting access to the combined data graph in accordance with a restriction associated with the first source.

21. The method of claim 15, wherein the substituting includes:

determining that a first source evidence file fails to map to the third identifier space, the first source evidence file mapping a first source identifier for a particular entity to a second source identifier in a fourth identifier space, determining that a second source evidence file maps from the fourth identifier space to the third identifier space, the second source evidence file mapping the second source identifier to a global identifier in the third identifier space; and replacing, using the first source evidence file and the second source evidence file, the first source identifier with the global identifier in the reconciled version of the first source data graph.

* * * * *